United States Patent Office 2,938,656
Patented May 31, 1960

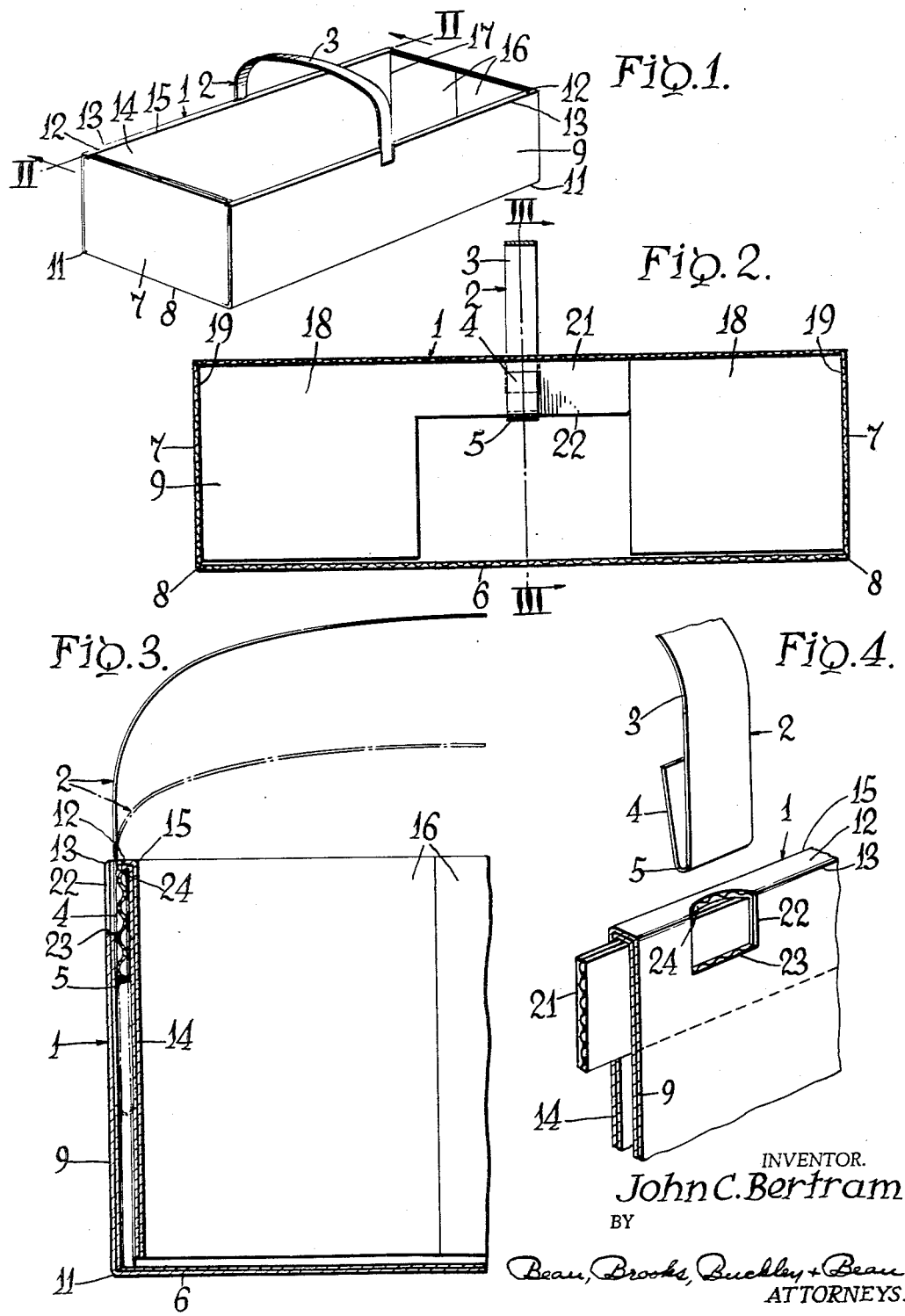

2,938,656

BASKET AND HANDLE COMBINATION

John C. Bertram, Mayville, N.Y., assignor to Bertram Wire Products, Inc., Buffalo, N.Y.

Filed Feb. 3, 1958, Ser. No. 712,774

8 Claims. (Cl. 229—52)

This invention relates generally to the container art, and more specifically to a new and useful basket and handle combination of the type used for carrying fresh vegetables and fruit.

It is a primary object of my invention to provide a novel basket in combination with a strap type of handle having resiliently flexible anchoring tabs adjacent the opposite ends thereof, and which permits telescoping of the handle relative to the basket, requires no additional anchoring or basket reinforcing means such as stapling, stitching, nailing and the like, and holds the handle rigidly against lateral rocking relative to the basket.

Still another object of my invention is to provide the foregoing in a basket and handle combination which is relatively simple and inexpensive in construction while being extremely durable and dependable in operation.

Such a flexible, strap type of handle, in conjunction with an appropriate basket, retains, to a much greater degree than wire handles, the various advantages of wood handles heretofore commonly used with baskets of this general type while avoiding most of the disadvantages thereof. However, such a strap handle can not effectively be used with an ordinary basket and the provision of a basket suitable for use in combination therewith presents many problems which are solved by this invention.

A combined basket and handle constructed in accord with my invention is characterized by the provision of a basket having bottom and opposite side and end walls, the side walls comprising paired wall members laterally spaced apart relative to each other and a top wall portion extending between the upper edges thereof, a basket tab portion between each of the paired wall members intermediate the opposite ends of the basket, the tab portions being spaced from the basket bottom wall and adapted to bear against the underside of the top wall portions, and one of the side wall members of each pair thereof having an opening therethrough and a handle having anchoring tabs inserted through the side wall openings into the space between the paired wall members for engagement with the basket tab portions.

The foregoing and other objects, advantages and characterizing features will become clearly apparent from the ensuing detail description of a presently preferred embodiment of basket constructed in accord with my invention, in conjunction with the accompanying drawing wherein like reference numerals denote like parts throughout the various views and wherein:

Fig. 1 is a perspective view of a basket and handle combination in accord with my invention;

Fig. 2 is an enlarged, longitudinal sectional view thereof, taken about on line II—II of Fig. 1;

Fig. 3 is an enlarged, fragmentary, transverse sectional view thereof, taken about on line III—III of Fig. 2; and Fig. 4 is an enlarged, fragmentary perspective view illustrating the manner of assembling the basket and its carrying handle.

Referring now in detail to the illustrated embodiment, the basket is generally designated 1 and is of a construction to be described, and is particularly adapted to receive and effectively utilize a handle such as that illustrated and generally designated 2. Handle 2 is of the type previously referred to, comprising a main body portion 3 terminating adjacent the opposite ends thereof in anchoring tab portions 4, reversely bent relative to main body portion 3 about transverse axes or lines of juncture therewith, indicated at 5. Handle 2 can be formed of a single piece of resiliently flexible material, such as for example paper, a suitable plastic, or metal, as illustrated, or it can be formed of a number of pieces secured together in which case still other materials, including wood, might be used.

Basket 1 preferably is fabricated from a single piece of corrugated board, of the type commonly used in such baskets, being cut and scored in the usual manner to provide a bottom wall 6, opposite end walls 7 joined thereto along fold lines 8, opposite outer side wall members 9 joined to bottom wall 6 along fold lines 11, top wall portions 12 joined to outer side wall members 9 along fold lines 13 and to inner wall members 14 along fold lines 15, opposite end wall tabs 16 joined to inner side wall members 14 along fold lines 17 and end tabs 18 joined to end wall members 7 along fold lines 19. Originally the basket is formed in blank, flat condition, and then folded along the various fold lines 8, 11, 13, 15, 17 and 19 to the completed basket form illustrated in the drawings wherein the end wall tabs 16 abut one another and lie against the opposite end wall members 7, with the end tabs 18 extending from end wall members 7 into the space between the outer and inner side wall members 9 and 14. The inner and outer wall members 14 and 9 are spaced apart by top wall portions 12 a distance slightly greater than the thickness of the corrugated board forming the basket.

The basket construction as described above is conventional. However, whereas normally the end tabs 18 are completely spaced apart and terminate far short of the mid-point of the basket, in accord with my invention I further provide the basket with tab portions 21 which comprise integral extensions of two of the end tabs 18, on opposite sides of the basket, and which extend therefrom closely adjacent top wall portions 12 and in spaced relation to bottom wall 6 across the longitudinal mid-point of the basket toward the other end tabs 18, as clearly illustrated in Fig. 2.

Thus, the tab portions 21 have their bottom edges spaced a substantial distance from bottom wall 6 of the basket, with their upper edges closely adjacent the undersurface of top wall portions 12 so as to bear thereagainst, and they extend across the longitudinal mid-point of the basket in the spaces between the inner and outer wall members 14 and 9 of the basket side walls.

To enable insertion of the handle end portions into the spaces between the basket side wall members 9 and 14, for engaging anchor tabs 4 around the tab portions 21, I provide openings 22 in one wall member of each side wall, preferably the outer side wall members 9. Openings 22 are at the longitudinal mid-point of the basket and extend from top wall portions 12 downwardly along wall members 9 to a point no lower than the bottom edge of tab portions 21, and preferably spaced thereabove so that the bottom edge 23 of each opening 22 is positioned about half way down tab portions 21.

Thus, when basket 1 has been assembled to the form shown in Fig. 1, the opposite ends of handle 2 can be slipped downwardly into the opposite side walls, being inserted between tab portions 21 and outer side wall members 9. The resiliently flexible anchoring tabs 4 yield to permit such slip-fitting insertion, and when they are below the bottom edge of tab portions 21, in the free space between the paired wall members 9 and 14 and end tabs 18, the handle anchoring tabs 4 resiliently expand so that, upon lifting upwardly on handle 2, they slip between basket tab portions 21 and inner side wall members 14 with the junctures 5 between the handle main body 3 and anchoring tabs 4 bearing against the bottom edge of the basket tab portions 21.

This arrangement offers many advantages. For example, the handle can be assembled on the basket even after it is filled, which is not possible with handles which must be stapled or similarly fastened to the basket. It is necessary merely to slip-fit the opposite ends of the handle into the basket sides in the manner described above, and upon lifting the basket by the handle it will automatically anchor itself in the proper position. This is accomplished extremely rapidly, simply and safely, without requiring expensive subsequent operations and fastening machinery. The weight of the basket is assumed by the basket tab portions 21 which receive the handle along their lower edges, and which are reinforced by bearing against the basket top wall portions 12. The handle anchoring tabs 4 are held between the inner side wall members 14 and the tab portions 21, so that they are securely anchored and can not pull loose, whereby the handle is securely anchored to the basket and the basket is self-reinforcing.

Further, when desired the handle 2 can be telescoped into the basket, with the handle ends moving down into the space between the side wall members 9 and 14, which permits greater stacking of assembled baskets and handles both before and after packing. The handle automatically moves to the proper carrying position when the basket is lifted by its handle.

With the lower edge 23 of the basket openings 22 positioned well above the lower edge of tab portions 21, the basket outer side wall members 9 also assist in securely confining the handle ends in anchoring position, cooperating with the inner wall members 14 to hold the anchoring tabs 4 and adjacent main body part 3 therebetween and against tab portions 21 and to still further reinforce the latter and avoid buckling thereof. Also, this insures that when the handle ends are telescoped downwardly they will move into the space between the wall members 9 and 14, and will not inadvertently slip out of the basket side walls and slide downwardly along the outer side of wall member 9.

Further, the opposite side edges of openings 22 are spaced apart a distance only slightly greater than the width of the handle 2, to provide substantially no more than working clearance enabling slip-fitting of the handle end portions through the openings. In this way, the opposite side edges of the basket openings 22 hold the handle against lateral rocking relative to the basket, thereby making the handle substantially rigid with the basket once it is assembled thereto. This anchoring of the handle against lateral rocking relative to the basket is highly desirable, providing a conveniently manipulated and very secure construction, and is further insured by the transversely flat handle portions 25 bearing against the bottom edge of tab portions 21.

It will be observed that upon lifting upwardly on handle 2 the main body part 3 thereof adjacent anchoring tabs 4 will lie against the outer sides of tab portions 21, which reinforces the assembly and is to be desired. To permit this without tearing the adjacent basket top wall portions 12, I extend openings 22 into the top wall portions, by providing concave recesses 24 therein which open into the openings 22 and which fully accommodate the adjacent parts of the handle and permit them to lie against the tab portions 21.

Further, recesses 24 extend only approximately two-thirds of the distance across top wall portions 12 so that they uncover only the space between tab portions 21 and the outer side wall members 9 while blocking entrance to the space between tab portions 21 and the inner side wall members 14. In this way, proper insertion of the handle ends into the basket side walls is insured. In other words, where the anchoring tabs 4 are inturned on the opposite ends of the handle main body 3 and the handle ends therefore are to be inserted between the outer side wall members 9 and the tab portions 21, the openings 22, 24 permit this while preventing inadvertent insertion thereof between the inner side wall members 14 and tab portions 21. This is accomplished automatically, without any conscious effort on the part of the person assemblying the basket.

Of course, if the anchor tabs 4 on handle 2 were outturned, then the reverse would be true and openings 22 would be provided in the inner side wall members 14 with the recesses 24 extending therefrom into top wall portions 12, thereby to permit insertion only between the inner side wall members 14 and tab portions 21.

Therefore, my invention fully accomplishes its intended objects, providing a combined basket and handle construction which is relatively inexpensive and simple and which in fact utilizes a portion of the corrugated board which is normally cut off when forming a basket blank. This comprises the tab portions 21 which can be positioned on end tabs 18 adjacent the same end of the basket, or adjacent opposite ends thereof, so long as tab portions 21 are provided on opposite sides of the basket. The basket tab portions 21, in conjunction with the side wall openings 22 and their top wall extensions 24, provide a basket construction which effectively utilizes a handle of the type described, and provides a novel basket and handle combination which is competitive in price with the conventional constructions and which possesses many advantages which they do not have while avoiding many of the disadvantages thereof.

For example, in addition to the advantages previously mentioned, it will be noted that with my construction the same handle can be used with baskets of different sizes adapted to carry anywhere from four to sixteen quarts. The basket construction remains the same in each instance, and the handle is simply flexed as necessary to span the various basket widths, with the basket readily accommodating the handle in any of its flexed positions.

This means that, whereas with conventional basket-handle combinations it is necessary to supply and stock handles of different sizes for use with baskets of different sizes, with my invention only one size handle need be furnished for use with baskets of widely different widths. This results in a substantial saving in the space and investment required for handle inventory.

While only one, presently preferred embodiment is disclosed in detail herein, I do not thereby intend that my invention be limited to such details. Instead, I recognize that modifications and variations will readily occur to those skilled in the art without departing from the spirit of my invention and the scope of the appended claims.

Having fully disclosed and completely described my invention, together with its mode of operation, what I claim as new is:

1. In combination with a handle of resiliently flexible material having a main body portion and transversely substantially flat anchoring tab portions adjacent the opposite ends thereof, a basket having bottom and opposite side and end walls, each of said basket side walls comprising a pair of normally generally vertical wall members in laterally spaced apart relation to each other and a normally generally horizontal top wall portion extending between the upper edges thereof, a basket tab portion between each of said paired wall members intermediate the opposite ends thereof, each of said basket tab portions having a bottom edge portion spaced from said basket bottom wall for receiving the junctures between said handle main body and anchoring tab portions and bearing against the underside of said basket top wall portions, and means providing an opening through each of said basket side walls enabling insertion of said handle anchoring tab portions into the space between said paired wall members thereof below said basket tab portions said handle anchoring tab portions being received between said basket tab portions and a wall member of each of said side walls upon lifting upwardly on said handle when said basket is loaded.

2. The combination set forth in claim 1, wherein said basket side wall openings are formed in one wall member of each pair thereof and extend downwardly along said one wall member from said top wall portions to a point spaced substantially above said bottom edge portions of said basket tab portions, whereby said handle anchoring tab portions can be slip-fitted between said one wall member and said basket tab portions into the space between said wall members and said handle anchoring tab portions thereafter received between said basket tab portions and the others of said wall members, and thereby ensuring movement of said handle anchoring tab portions into the space between said paired wall members and below said basket tab portions upon downward telescoping of said handle relative to said basket, the opposite side edges of said basket side wall openings being spaced apart a distance exceeding the width of said handle main body part substantially only sufficiently to provide working clearance therebetween, whereby slip-fitting of said handle anchoring tab portions through said openings and telescoping thereof into said side walls are permitted while said handle is held by said opposite side edges against lateral movement relative to said basket.

3. The combination set forth in claim 2, wherein said basket side wall openings also extend into said top wall portions a distance sufficient to permit said handle main body part to lie against said basket tab portions substantially without tearing said top wall portions while precluding inadvertent insertion of said handle anchoring tab portions between the others of said side wall members and said basket tab portions, the portions of said handle main body part adjacent said handle anchoring tab portions being confined between said one side wall members and said basket tab portions when said handle anchoring tab portions are confined between said other side wall members and said basket tab portions.

4. In combination with a handle having reverse bent anchoring tab portions of resiliently flexible material adjacent the opposite ends thereof, a basket comprising a single piece of corrugated board formed to provide bottom and opposite side and end walls, each of said side walls comprising normally generally vertical paired wall members in laterally spaced apart relation to each other and a normally generally horizontal top wall portion extending between the upper edges thereof, said piece of corrugated board also providing a tab portion extending from at least one of said end walls into the space between each of said paired wall members, said basket tab portions having lower edge portions spaced from said bottom wall a distance sufficient to enable passage of said handle anchoring tab portions therebetween and having upper edge portions alined with the undersurface of said top wall portions for bearing thereagainst, and means providing an opening through one side wall member of each pair thereof, said openings extending from adjacent said top wall portions downwardly to a point no lower than said basket tab lower edge portions for receiving said handle anchoring tab portions, and enabling passage thereof into the space between said paired wall members, said handle anchoring tab portions being received between said basket tab portions and the others of said side wall members upon lifting upwardly on said handle when said basket is loaded.

5. The combination set forth in claim 4, wherein said openings extend into said top wall portions toward said other wall members a distance sufficient to enable said handle to bear against the side of said basket tab portions without tearing said top wall portions while precluding accidental insertion of said handle anchoring tab portions between the others of said side wall members and said basket tab portions.

6. The combination set forth in claim 4, wherein the opposite side edges of said side wall openings are spaced apart a distance substantially equal to the width of said handle to be received thereby, so as to permit said handle to be slip-fitted therethrough while holding the same substantially laterally rigid relative to said basket.

7. In combination, a strap type of handle having resiliently flexible anchoring tab portions adjacent the opposite ends thereof, and a basket having bottom and opposite side and end walls, each of said side walls comprising normally generally vertical side wall parts in laterally spaced apart relation, a normally generally horizontal top wall portion bridging the upper edges of said opposite side wall parts, and a tab portion between each of said opposite side wall parts, each of said basket tab portions having a bottom edge portion spaced from said bottom wall receiving said anchoring tab portions therearound and a top edge portion arranged to bear against the under surface of its associated top wall portion, and means defining an opening in one side wall part of each side wall for inserting said anchoring tab portions therethrough into the space between said side wall parts and below said basket tab portions.

8. In combination, a strap type of handle having resiliently flexible anchoring tab portions adjacent the opposite ends thereof, and a basket having bottom and opposite side and end walls, each of said side walls comprising normally generally vertical side wall parts in laterally spaced apart relation, a normally generally horizontal top wall portion bridging the upper edges of said opposite side wall parts, and a tab portion between each of said opposite side wall parts, each of said basket tab portions having a bottom edge portion spaced from said bottom wall for receiving said anchoring tabs therearound and a top edge portion arranged to bear against the under surface of its associated top wall portion, and means defining an opening in one side wall part of each side wall for inserting said anchoring tab portions therethrough into the space between said side wall parts and below said basket tab portions, said openings extending downwardly from said top wall portions to a point spaced substantially above said tab bottom edge portions and into said top wall portions substantially no more than about two-thirds the width thereof, thereby enabling insertion of said handle ends into said basket only between said one side wall parts and said basket tab portions and enabling the portions of said handle adjacent the tab portions thereof to lie against said basket tab portions between the same and said one side wall parts while said handle tab portions are between said basket tab portions and the other side wall parts.

References Cited in the file of this patent
UNITED STATES PATENTS

| 2,570,804 | Hazenfield | Oct. 9, 1951 |

FOREIGN PATENTS

| 118,574 | Switzerland | May 2, 1927 |
| 17,304 | Norway | June 10, 1907 |